[12] United States Patent
Kang et al.

(10) Patent No.: US 9,996,257 B2
(45) Date of Patent: *Jun. 12, 2018

(54) MOTION BASED SERVICE PROVISION

(71) Applicant: KT CORPORATION, Seongnam (KR)

(72) Inventors: Moon-Soon Kang, Seongnam-si (KR); Jang-hyuk Park, Seoul (KR)

(73) Assignee: KT CORPORATION, Seongnam-si, Gyeonggi-Do (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/376,936

(22) Filed: Dec. 13, 2016

(65) Prior Publication Data

US 2017/0090746 A1   Mar. 30, 2017

Related U.S. Application Data

(63) Continuation of application No. 13/909,668, filed on Jun. 4, 2013, now Pat. No. 9,558,652.

(30) Foreign Application Priority Data

Jun. 7, 2012  (KR) .......................... 10-2012-0061146

(51) Int. Cl.
*G06F 3/0488* (2013.01)
*H04W 4/00* (2018.01)
(Continued)

(52) U.S. Cl.
CPC ........ *G06F 3/04883* (2013.01); *G06F 3/0346* (2013.01); *G08C 17/02* (2013.01); *H04W 4/008* (2013.01); *G06F 2203/0384* (2013.01)

(58) Field of Classification Search
CPC ... G06F 3/0346; G06F 3/04883; G08C 17/02; H04W 4/008; H04W 4/02; G06Q 30/02;
(Continued)

(56) References Cited

U.S. PATENT DOCUMENTS 6,414,635 B1   7/2002  Stewart
7,778,886 B1 *  8/2010  Maroney ................ G06Q 30/02
                                                    705/26.1
(Continued)

*Primary Examiner* — Orlando Bousono
(74) *Attorney, Agent, or Firm* — Brundidge & Stanger, P.C.

(57) ABSTRACT

In one example embodiment, a display apparatus includes a memory, implemented as part of the display apparatus and configured to store a plurality of reference motion information associated with a plurality of services and service information regarding the plurality of services; a reader, implemented as part of the display apparatus and configured to read motion information, received from a mobile end device, regarding a motion that was enacted upon the mobile end device; a service selector, implemented as part of the display apparatus and configured to compare the read motion information with the stored plurality of reference motion information to select a service from among the stored plurality of services; and a stationary display, implemented as part of the display apparatus that is physically separated from the mobile end device, configured to display an expression of the selected service.

5 Claims, 13 Drawing Sheets

(51) Int. Cl.
*G08C 17/02* (2006.01)
*G06F 3/0346* (2013.01)

(58) Field of Classification Search
CPC . G06Q 30/0601; G01C 21/20; G01C 21/3664
See application file for complete search history.

(56) References Cited

U.S. PATENT DOCUMENTS

| | | | | |
|---|---|---|---|---|
| 8,027,889 | B1* | 9/2011 | Maroney | G06Q 20/12 |
| | | | | 705/26.61 |
| 9,264,428 | B1* | 2/2016 | Maroney | G06Q 20/12 |
| 2003/0236824 | A1 | 12/2003 | Stewart | |
| 2004/0164148 | A1 | 8/2004 | Qiu | |
| 2005/0245271 | A1* | 11/2005 | Vesuna | G06Q 10/08 |
| | | | | 455/456.1 |
| 2006/0000911 | A1 | 1/2006 | Stekel | |
| 2006/0143441 | A1* | 6/2006 | Giobbi | G06F 21/32 |
| | | | | 713/155 |
| 2006/0220838 | A1 | 10/2006 | Wakim | |
| 2007/0011285 | A1 | 1/2007 | Chraiet | |
| 2008/0150678 | A1* | 6/2008 | Giobbi | G07F 17/32 |
| | | | | 340/5.2 |
| 2008/0263175 | A1 | 10/2008 | Naono | |
| 2009/0171559 | A1* | 7/2009 | Lehtiniemi | G01C 21/20 |
| | | | | 701/533 |
| 2009/0179739 | A1 | 7/2009 | Kim | |
| 2009/0276236 | A1 | 11/2009 | Adamczyk | |
| 2009/0302998 | A1* | 12/2009 | Trappeniers | H04L 63/0853 |
| | | | | 340/5.61 |
| 2009/0319181 | A1 | 12/2009 | Khosravy | |
| 2010/0031329 | A1 | 2/2010 | Kim | |
| 2010/0052855 | A1 | 3/2010 | Broos | |
| 2010/0161437 | A1 | 6/2010 | Pandey | |
| 2010/0222021 | A1 | 9/2010 | Balsan | |
| 2010/0228612 | A1* | 9/2010 | Khosravy | G01C 21/20 |
| | | | | 705/14.4 |
| 2010/0282837 | A1 | 11/2010 | Yoo | |
| 2010/0312833 | A1* | 12/2010 | Rimmer | G08B 21/0415 |
| | | | | 709/204 |
| 2010/0325427 | A1 | 12/2010 | Ekberg | |
| 2011/0016328 | A1 | 1/2011 | Qu | |
| 2011/0040757 | A1 | 2/2011 | Kossi | |
| 2011/0221568 | A1* | 9/2011 | Giobbi | G06F 19/322 |
| | | | | 340/5.82 |
| 2011/0258443 | A1 | 10/2011 | Barry | |
| 2012/0054848 | A1 | 3/2012 | Salowey | |
| 2012/0094626 | A1 | 4/2012 | Kim | |
| 2012/0329486 | A1* | 12/2012 | Gits | H04W 4/12 |
| | | | | 455/466 |
| 2013/0069782 | A1 | 3/2013 | Duggal | |
| 2013/0147970 | A1 | 6/2013 | Herring | |

* cited by examiner

MOTION BASED SERVICE PROVISION

CROSS-REFERENCE TO RELATED APPLICATION(S)

This is a continuation application of U.S. patent application Ser. No. 13/909,668, filed on Jun. 4, 2013 which claims the benefit under 35 U.S.C. § 119(a) of a Korean Patent Application No. 10-2012-0061146, filed on Jun. 7, 2012, in the Korean Intellectual Property Office, the entire disclosure of which is incorporated herein by reference for all purposes.

TECHNICAL FIELD

The embodiments described herein pertain generally to schemes for requesting and providing services based on a motion enacted on an end device.

BACKGROUND

An electronic device may include a motion sensor and/or accelerometer that are configured to detect parameters of a motion enacted on the electronic device. The electronic device may use the detected motion to perform various functions or to execute one or more application programs hosted on the electronic device.

SUMMARY

In one example embodiment, an apparatus includes a reader configured to read motion information, received from an end device, regarding a motion that was enacted by a user relative to the end device; a request generator configured to generate a service request that includes an identifier of the apparatus and the read motion information; a transmitter configured to transmit, to a service provider, the service request; and a receiver configured to receive, from the service provider, an expression of a service that is associated with the identifier of the apparatus and the read motion information.

In another example embodiment, a display apparatus includes a memory, implemented as part of the display apparatus and configured to store a plurality of reference motion information associated with a plurality of services and service information regarding the plurality of services; a reader, implemented as part of the display apparatus and configured to read motion information, received from a mobile end device, regarding a motion that was enacted upon the mobile end device; a service selector, implemented as part of the display apparatus and configured to compare the read motion information with the stored plurality of reference motion information to select a service from among the stored plurality of services; and a stationary display, implemented as part of the display apparatus that is physically separated from the mobile end device, configured to display an expression of the selected service.

In yet another example embodiment, a server includes a memory configured to store an identifier of an object, reference motion information associated with a service, and service information regarding the service associated with the object; a receiver configured to receive a service request including the identifier of the object and motion information regarding a motion that was enacted by a user relative to an end device; an object identifier configured to identify the object based on the identifier of the object; a similarity calculator configured to determine that a similarity between the reference motion information and the received motion information is quantifiable to be at least a predetermined value; and a service transmitter configured to transmit an expression of the service to the identified object depending on the similarity.

In yet another example embodiment, a system includes an end device configured to: read an identifier of an object from the object, sense a motion of the end device, and transmit a service request that includes the identifier of the object and motion information regarding the sensed motion; and a service provider configured to: receive, from the end device, the service request, and provide the object with an expression of a service that is associated with the identifier of the apparatus and the motion information of the end device. The object is located within a predetermined range of the end device.

In yet another example embodiment, a system includes an apparatus configured to: read motion information, received from an end device, regarding a motion that was taken by a user of the end device, and transmit a service request that includes the motion information and an identifier of the apparatus; and a service provider configured to: receive, from the apparatus, the service request, and provide the apparatus with an expression of a service that is associated with the identifier of the apparatus and the motion information of the end device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
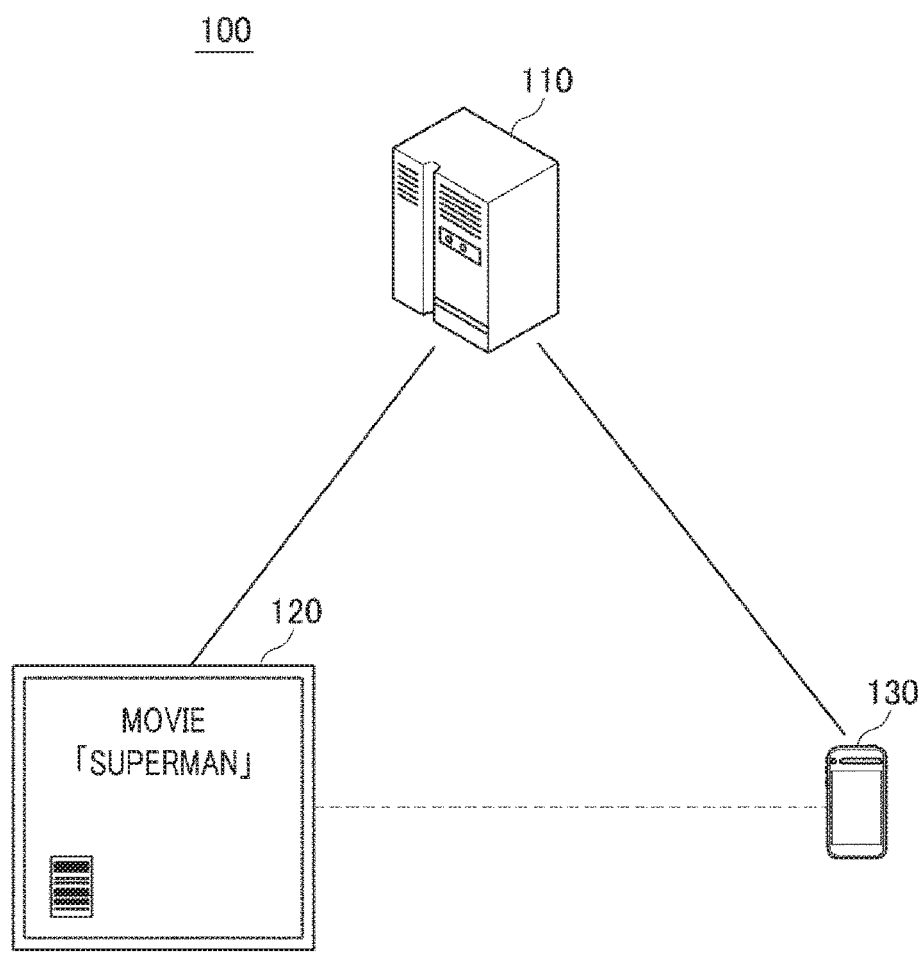
FIG. 1 shows an example system configuration in which one or more embodiments of motion based service provision may be implemented.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example system configuration in which one or more embodiments of motion based service provision may be implemented. As depicted in FIG. 1, system configuration 100 includes, at least, a service provider 110, an object 120 and an end device 130.

Service provider 110 may refer to an organization or entity that provides some type of communications, data storage, data or information processing, content service, or any combination thereof for business customers or consumers. Service provider 110 may host one or more servers or other processing apparatuses that may be configured to receive one or more service requests from at least one of object 120 or end device 130, and to provide object 120 with one or more expressions of at least one service in response to the received service request. Non-limiting example of service provider 110 may include an Internet service provider, i.e., ISP; application service provider, i.e., ASP; storage service provider, i.e., SSP; and television service provider, i.e., cable TV, DSL and DBS. Further, non-limiting example of expressions of at least one service in response to the received request may include information regarding the subject matter that is displayed or advertised on object 120.

Object 120 may refer to an apparatus or a display medium that may display at least, e.g., one or more videos, advertisements, etc. By way of example, but not limitation, object 120 may include a digital sign or an electronic display. As non-limiting examples, object 120 may include electronic billboards of various size that are disposed along roadsides, in store-front displays or windows, along sidewalks, at bus stops, in airports, on shopping kiosks, etc.

End device 130 may refer to a notebook, a personal computer, a personal communication terminal, such as PCS (Personal Communication System), GMS (Global System for Mobile communications), PDC (Personal Digital Cellular), PDA (Personal Digital Assistant), IMT (International Mobile Telecommunication)-2000, CDMA (Code Division Multiple Access)-2000, W-CDMA (W-Code Division Multiple Access) and Wibro (Wireless Broadband Internet) terminals.

As referenced herein, a user (not shown) who owns or otherwise exercises control over an embodiment of end device 130 may move in such a manner to enact one or more detectable motions upon or by end device 130. Thus, some example embodiments of end device 130 may include at least one motion sensor, e.g., gyroscope, accelerometer, motion detecting camera, etc. Further, non-limiting examples of movements or motions enacted by the user on end device 130 may include shaking end device 130 to a certain side (e.g., a left side or a right side), shaking end device 130 along a predetermined pattern (e.g., shaking end device 130 along a circular shape or shaking end device 130 along a triangle shape) or rotating end device 130 with regard to a virtual rotation axis.

In some example embodiments, object 120 may display an advertisement regarding a movie (e.g., 'SUPERMAN') and end device 130 may be located within a predetermined communication range of object 120 to receive an expression of a service regarding the movie, i.e., that is currently displayed or advertised on object 120. As set forth above, non-limiting example of expressions of at least one service in response to the received request may include information regarding the subject matter that is displayed or advertised on object 120. Thus, in accordance with the aforementioned example embodiments, the expression of the service regarding the movie may include a synopsis of the movie, show times for the theaters, ticket availability for particular showings, ticket prices, etc.

In some embodiments, end device 130 may be configured to read identification information regarding object 120 that is received from object 120. By way of example but not limitation, the identification information regarding object 120 may include at least one of a unique identifier of object 120, a media access control (MAC) address of object 120, an internet protocol (IP) address of object 120, a uniform resource identifier (URI) stored in object 120, a location of object 120, etc.

The identification information regarding object 120 may be stored in an electronic tag (not shown), by an owner and/or entity that exercises control over at least object 120, which may be embedded in, attached to, or otherwise associated with object 120. End device 130 may read the identification information regarding object 120 from the electronic tag. By way of example but not limitation, the electronic tag may include at least one of a radio frequency identification (RFID) tag, a near field communication (NFC) tag, a barcode, a quick response code, etc. By way of example, the electronic tag may be attached to a surface of object 120 or alternatively, the electronic tag may be inserted in object 120 as an electronic chip. End device 130 may have a reader enable to read information from the electronic tag, such as a radio frequency identification reader, a near field communication reader, a barcode reader, a quick response code reader, etc.

End device 130 may be configured to obtain the identification information regarding object 120 via a wireless network between object 120 and end device 130. By way of example, but not limitation, the wireless protocol between object 120 and end device 130 may refer to at least one of a near field communication (NFC), Bluetooth, or peer to peer (P2P) communication protocol.

End device 130 may be configured to sense a motion that was enacted by the user on end device 130 by using one or more of well-known motion sensors such as a gyroscope, an accelerometer, or a motion detecting camera that are built-in, connected, or otherwise associated with end device 130. By way of example but not limitation, the motion of end device 130 may refer to at least one of a posture of end device 130 at a certain time, a number of rotations of end device 130 during a predefined period of time, or a pattern of movement enacted by a user on end device 130.

As referenced herein, the "posture" of end device 130 may refer to the actual physical disposition of the device, as sensed by one or more of the associated gyroscope, accelerometer, motion detecting camera, etc. The aforementioned disposition may be made with regard to geographic location, e.g., city, street address, latitude and longitude, cardinal direction (east, west, north, or south).

As referenced herein, a "certain time" may refer to a time at which a posture of end device 130, physical disposition of end device 130, or motion enacted upon end device 130 is sensed, detected, and/or recorded.

As referenced herein, a "number of rotations" of end device 130 may refer to a number that may be counted/recorded as the device rotates with regard to a virtual rotation axis.

Then, end device 130 may be configured to transmit a service request to service provider 110 via a wireless or a wired network. The service request may include the identification information regarding object 120 and the motion information regarding the sensed motion of end device 130. By way of example hut not limitation, the user of end device 130 may pre-register at least one service request in a memory of end device 130, and end device 130 may derive the service request from the memory of end device 130. Alternatively, end device 130 may generate the service request when end device 130 obtains the identification information regarding object 120 and the motion information of end device 130.

Optionally, end device 130 may further transmit additional information to service provider 110 in addition to the service request, via a wireless or wired network. By way of example, but not limitation, the additional information may include at least one of a time at which end device 130 sensed the motion enacted thereon, weather information in the vicinity of end device 130 when end device 130 sensed the motion enacted thereon, noise information in the vicinity of end device 130 when end device 130 sensed the motion enacted thereon, or user information regarding the user of end device 130. End device 130 may detect at least one of the time, the weather information or the noise information by using any one of well-known sensors such as a clock, a thermometer, or a hygrometer installed in, connected to, or otherwise associated with end device 130. Alternatively, end device 130 may receive at least one of the time, the weather information or the noise information from an external server/apparatus (not illustrated in FIG. 1). By way of example but not limitation, the user information regarding the user of end device 130 may include at least one of an age of the user, a gender of the user, etc.

Service provider 110 may receive the service request including the identification information regarding object 120 and the motion information regarding the motion enacted on end device 130 from end device 130, via wired or wireless network. Further, service provider 110 may select a service from among multiple services stored in a memory of service provider 110 based on the identification information regarding object 120 and motion information of end device 130.

In some embodiments, service provider 110 may pre-register and store identification information of at least one object including object 120 and reference motion information regarding at least one reference motion in association with at least one service. Such a motion may be referred to as a reference motion, which may be a motion that is enacted by the user of end device 130 relative to, i.e., on or upon, end device 130 with the intention to receive an expression of a service from service provider 110. In some embodiments, a depiction of the reference motion may be displayed for the user's reference on a display of end device 130 or a display of object 120. Therefore, when a motion that corresponds to the reference motion is sensed by the motion sensor that is built-in, connected to, or otherwise associated with end device 130 and motion information regarding the sensed motion is transmitted to service provider 110, service provider 110 may provide a service expression of a service associated with the reference motion to object 120.

Service provider 110 may be further configured to identify object 120 based on the received identification information regarding object 120. In this regard, service provider 110 may be configured to calculate a motion similarity between the reference motion stored in the memory of service provider 110 and the motion of end device 130. Then, service provider 110 may determine whether a calculated quantified value of the motion similarity is at least a predetermined value stored in the memory of service provider 110. If the calculated quantified value of the motion similarity is at least the predetermined value, service provider 110 may select the service that is associated with object 120 and stored in the memory of service provider 110. Then, service provider 110 may provide an expression of the selected service to object 120, and the expression of the selected service may be displayed on object 120. As set forth above, non-limiting examples of expressions of a service stored in the memory of service provider 110 may include information regarding the subject matter that is displayed or advertised on object 120.

In some embodiments, service provider 110 may further receive the additional information from end device 130 in addition to the service request, via a wired or wireless network. In some embodiments, service provider 110 may pre-register and store the multiple services in association with at least one of the aforementioned additional information, e.g., time ranges at which a service is provided to object 120, weather conditions, noise levels, age groups of users, or genders of users. Then, service provider 110 may select a service from among the multiple services further based on the received additional information and provide an expression of the selected service to object 120.

Object 120 may be configured to read the motion information regarding the motion enacted on end device 130. In some embodiments, object 120 may read the motion information of end device 130 by using a reader connected to or otherwise associated with the aforementioned electronic tag that may be attached to a surface of end device 130 or inserted in end device 130. By way of example, but not limitation, the electronic tag may include at least one of a radio frequency identification (RFID) tag, a near field communication (NEC) tag, a barcode, a quick response code, etc.

In some embodiments, object 120 may be configured to read the motion information regarding the motion enacted on end device 130 via a wireless network between object 120 and end device 130. By way of example but not limitation, the wireless network between object 120 and end device 130 may refer to at least one of a near field communication (NEC), Bluetooth, or peer to peer (P2P) communication protocol.

Object 120 may be configured to transmit a service request to service provider 110 via a wireless or a wired network. The service request may include the identification information of object 120 and the motion information of end device 130. By way of example, but not limitation, an owner or entity that exercises control over object 120 may pre-register at least one service request in a memory of object 120 and object 120 may derive the service request from the memory of object 120. Alternatively, object 120 may generate the service request when object 120 obtains the motion information of end device 130.

Optionally, object 120 may further transmit additional information to service provider 110 in addition to the service request via a wireless or a wired network. By way of example but not limitation, the additional information may include at least one of a time at which object 120 transmits the service request to service provider 110, a location of object 120 when object 120 read the motion information regarding the motion enacted on end device 130, weather information in the vicinity of object 120 when object 120 read the motion information regarding the motion enacted on end device 130, or noise information in the vicinity of object 120 when object 120 read the motion information regarding the motion enacted on end device 130. Object 120 may detect at least one of the time, the weather information or the noise information by using any one of well-known sensors such as a clock, a thermometer, or a hygrometer installed in, connected to, or otherwise associated with object 120. Alternatively, object 120 may receive at least one of the time, the weather information or the noise information from an external server/apparatus (not illustrated in FIG. 1). Further, object 120 may detect a location of object 120 by using any one of well-known location detecting schemes using a global positioning system (GPS), a third generation (3G) and/or fourth generation (4G) mobile telecommunication network system.

Service provider 110 may be configured to receive the service request including the identification information regarding object 120 and the motion information regarding the motion enacted on end device 130 from object 120 via a wireless or a wired network. Further, service provider 110 may select a service from among multiple services stored in a memory of service provider 110 based on the identification information regarding object 120 and motion information of end device 130. In some embodiments, service provider 110 may further receive the additional information from object 120 in addition to the service request via a wireless or a wired network and select a service further based on the received additional information.

Service provider 110 may be configured to provide an expression of the selected service to object 120 and the expression of the selected service may be displayed on object 120. As set forth above, non-limiting examples of expressions of a service stored in the memory of service provider 110 may include information regarding the subject matter that is displayed or advertised on object 120.

Thus, FIG. 1 shows an example system configuration 100 in which one or more embodiments of motion based service provision may be implemented.

Figure 2A:
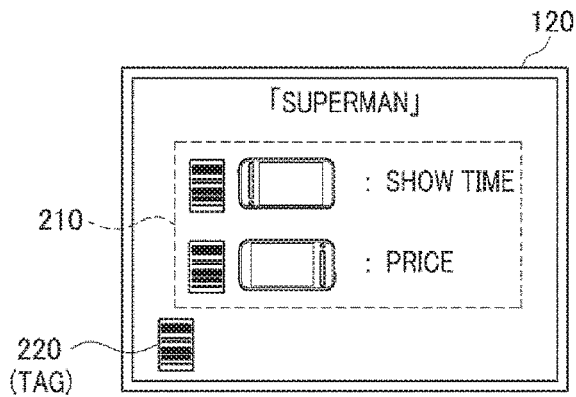
FIGS. 2A to 2C show illustrative examples of a system in which one or more embodiments of motion based service provision may be implemented.
Figure 2B:
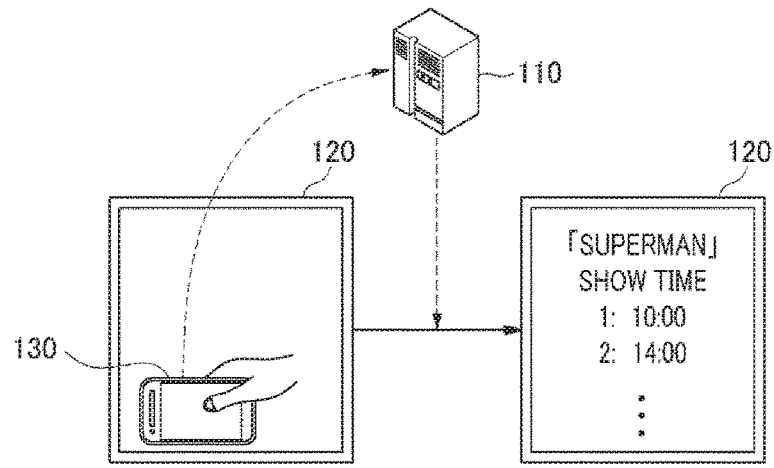
Figure 2C:
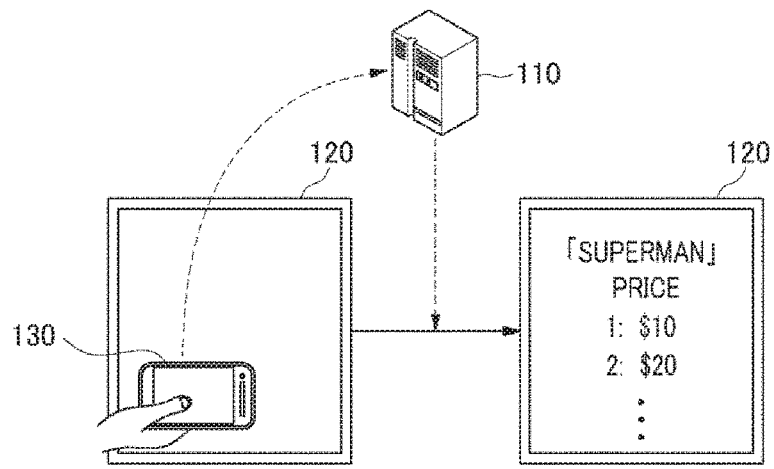

FIGS. 2A to 2C show illustrative examples of a system in which one or more embodiments of motion based service provision may be implemented. In some embodiments, service provider 110 may transmit, to object 120, the one or more embodiments of reference motion information 210 that depicts a motion to be enacted by a user of end device 130 relative to, i.e., on or upon, end device 130 with the intention to receive an expression of a service from service provider 110. When the user of end device enacts a motion that corresponds to the motion depicted in reference motion information 210, service provider 110 may provide a service expression to object 120. Object 120 may receive reference motion information 210 from service provider 110 and display reference motion information 210 for the user's reference on a display of object 120. By way of example but not limitation, reference motion information 210 may depict that a show time of a movie (e.g., 'SUPERMAN') is to be displayed when end device 130 touches or approaches an electronic tag 220 while tilting to, e.g., the left (relative to the user). Further, reference motion information 210 may depict that a price of a movie (e.g., 'SUPERMAN') is to be displayed when end device 130 touches or approaches electronic tag 220 while tilting to, e.g., the right (relative to the user).

In some embodiments, electronic tag 220 may be attached to object 120. However, one skilled in the art will appreciate that electronic tag 220 may be inserted in object 120 as a chip. By way of example but not limitation, electronic tag 220 may include at least one of a radio frequency identification (RFID) tag, a near field communication (NFC) tag, a barcode, a quick response code, etc.

In some embodiments, electronic tag 220 may store identification information of object 120. For example, a manufacturer of electronic tag 220 or an owner or an entity that exercises control over object 120 may pre-register and store the identification information of object 120 in a memory of object 120. By way of example but not limitation, the identification information of object 120 may include at least one of a unique identifier of object 120, a media access control (MAC) address of object 120, an internet protocol (IP) address of object 120, a uniform resource identifier (URI) stored in object 120, a location of object 120, etc.

By way of example, FIG. 2B depicts that end device 130 approaches electronic tag 220, while tilting to the, e.g., left (relative to the user). In some embodiments, end device 130 may read the identification information of object 120 from electronic tag 220 by a reader such as a radio frequency identification reader, a near field communication reader, a barcode reader, a quick response code reader, etc. In some embodiments, end device 130 may obtain the identification information of object 120 via a wireless network between object 120 and end device 130. By way of example, but not limitation, the wireless network between object 120 and end device 130 may refer to at least one of a near field communication (NFC), Bluetooth, or peer to peer (P2P) communication protocol.

Further, end device 130 may sense the motion of end device 130 (e.g., the tilting motion to the left) at the time of approaching electronic tag 220. By way of example, but not limitation, the motion of end device 130 may be sensed by using one or more of well-known motion sensors such as a gyroscope, an accelerometer and a motion detecting camera that are built-in, connected, or otherwise associated with end device 130.

Then, end device 130 may transmit a service request to service provider 110 via a wireless or a wired network. The service request may include the identification information of object 120 and motion information regarding the sensed motion (e.g., the I tilting motion to the left) enacted on end device 130.

Service provider 110 may receive the service request including the identification information of object 120 and the motion information of end device 130 from end device 130, via a wireless or wired network. Further, service provider 110 may select a service from among multiple services stored in a memory of service provider 110 based on the identification information of object 120 and motion information of end device 130. Then, service provider 110 may transmit an expression of the selected service to object 120. By way of example but not limitation, in a memory of service provider 110, a service expression listing a show time of a movie (e.g., 'SUPERMAN') that is advertised on object 120 is stored in association with a reference motion that is identical or analogous to the, e.g., left (relative to the used tilting motion of end device 130 and the identification information of object 120. Accordingly, as depicted in FIG. 2B, when end device 130 approaches electronic tag 220 while tilting to the, e.g., left (relative to the user), service provider 110 may transmit, to object 120, the service expression listing the show time of the movie that is advertised on object 120, and then the expression, i.e., show time, may be displayed on a display of object 120.

By way of example, FIG. 2C depicts that end device 130 approaches electronic tag 220, while tilting to, e.g., the right (relative to the user). End device 130 may obtain the identification information of object 120 from electronic tag 220. Further, end device 130 may sense the motion of end device 130 (e.g., the tilting motion to the right) at the time of approaching electronic tag 220. Then, end device 130 may transmit a service request to service provider 110 via a wireless or a wired network. The service request may include the identification information of object 120 and motion information regarding the sensed motion (e.g., the tilting motion to the right) enacted end device 130.

Service provider 110 may receive the service request including the identification information of object 120 and the motion information of end device 130 from end device 130, via a wireless or a wired network, and select a service from among multiple services stored in a memory of service provider 110 based on the identification information of object 120 and motion information of end device 130. Then, service provider 110 may transmit an expression of the selected service to object 120. By way of example but not limitation, in a memory of service provider 110, a service expression describing a price of a movie (e.g., 'SUPERMAN') that is advertised on object 120 is stored in association with a reference motion that is identical or analogous tilting motion to the right and the identification information of object 120. Accordingly, as depicted in FIG. 2C, when end device 130 approaches electronic tag 220 while tilting to the right, service provider 110 may transmit, to object 120, the service expression describing the price of the movie that is advertised on object 120, and then the expression, i.e., price, may be displayed on the display of object 120.

Thus, FIGS. 2A to 2C show illustrative examples of a system in which one or more embodiments of motion based service provision may be implemented.

Figure 3A:
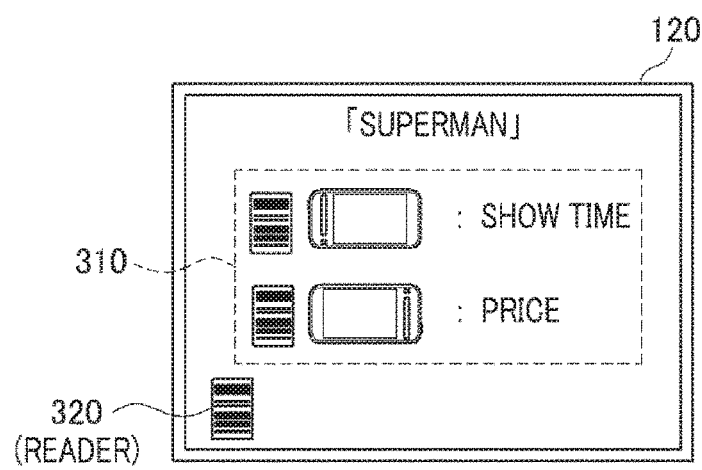
FIGS. 3A to 3C show yet other illustrative examples of a system in which one or more embodiments of motion based service provision may be implemented.
Figure 3B:
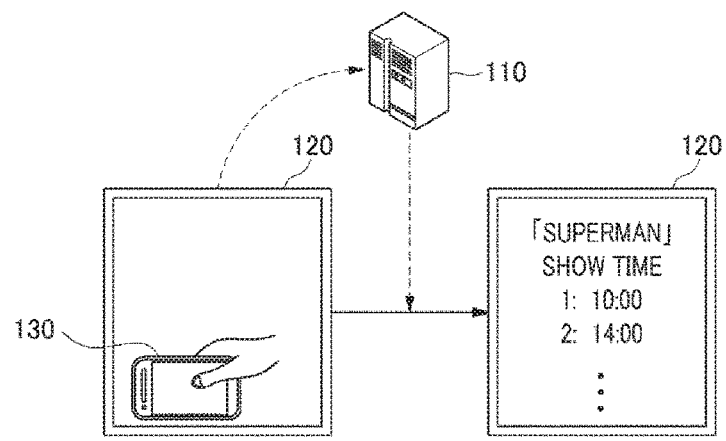
Figure 3C:
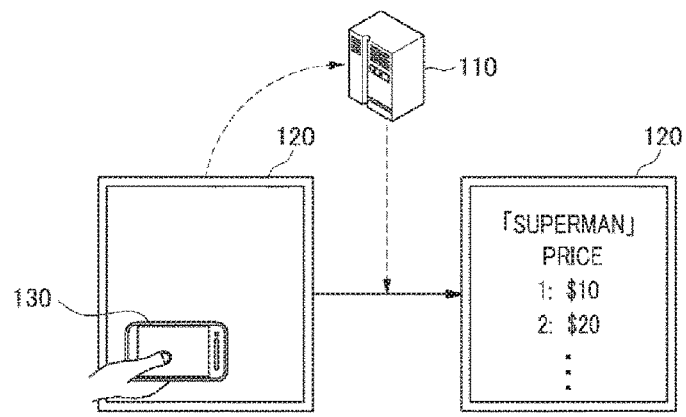

FIGS. 3A to 3C show yet other illustrative examples of a system in which one or more embodiments of motion based service provision may be implemented. In some embodiments, service provider 110 may transmit reference motion information 310 to object 120. Further, object 120 may receive the one or more embodiments of reference motion information 310 from service provider 110 and display reference motion information 310. By way of example but not limitation, reference motion information 310 may depict that a show time of a movie (e.g., 'SUPERMAN') that is advertised on object 120 is displayed when end device 130 touches or approaches a reader 320 while tilting to, e.g., the left (relative to the user). Further, reference motion information 310 may depict that a price of a movie (e.g., 'SUPERMAN') that is advertised on object 120 is displayed when end device 130 touches or approaches reader 320 while tilting to, e.g., the right (relative to the user).

In some embodiments, object 120 may have reader 320 to read motion information regarding a motion enacted on end device 130 from an electronic tag (not illustrated in FIGS. 3A to 3C) that is attached or otherwise connected to a surface of end device 130 or inserted in end device 130. By way of example but not limitation, the electronic tag may include at least one of a radio frequency identification (RFID) tag, a near field communication (NFC) tag, a barcode, a quick response code, etc. Further, by way of example hut not limitation, reader 320 may include a radio frequency identification reader, a near field communication reader, a barcode reader, a quick response code reader, etc.

By way of example, FIG. 3B depicts that end device 130 approaches reader 320, while tilting to the, e.g., left (relative to the user). In some embodiments, end device 130 may sense the motion (e.g., the tilting motion to the left) of end device 130 at the time of approaching reader 320 of object 120 and store the motion information regarding the sensed motion (e.g., the tilting motion to the left) in the electronic tag. Reader 320 of object 120 may read the motion information regarding the sensed motion enacted on end device 130 from the electronic tag.

Then, object 120 may transmit a service request to service provider 110 via a wireless or a wired network. The service request may include identification information of object 120 and the motion information regarding the motion (e.g., the tilting motion to the left) enacted on end device 130.

Service provider 110 may receive the service request including the identification information of object 120 and the motion information of end device 130 from object 120. Further, service provider 110 may select a service from among multiple services stored in a memory of service provider 110 based on the identification information of object 120 and the motion information of end device 130. Then, service provider 110 may transmit an expression of the selected service to object 120. Accordingly, as depicted in FIG. 3B, when end device 130 approaches reader 320 while tilting to the, e.g., left (relative to the used, service provider 110 may transmit, to object 120, the service expression listing a show time of the movie that is advertised on object 120, and then the expression, i.e., show time, may be displayed on a display of object 120.

By way of example, FIG. 3C depicts that end device 130 approaches reader 320, while tilting to the, e.g., right (relative to the user). End device 130 may sense the motion (e.g., the tilting motion to the right) enacted on end device 130 at the time of approaching reader 320 and store the motion information regarding the sensed motion (e.g., the tilting motion to the right) in the electronic tag. Reader 320 of object 120 may read the motion information of end device 130 from the electronic tag.

Then, end device 130 may transmit a service request to service provider 110 via a wireless or a wired network. The service request may include the identification information of object 120 and motion information regarding the sensed motion (e.g., the tilting motion to the right) of end device 130.

Service provider 110 may receive the service request including the identification information of object 120 and the motion information of end device 130 from object 120. Further, service provider 110 may select a service from among multiple services stored in the memory of service provider 110 based on the identification information of object 120 and the motion information of end device 130. Then, service provider 110 may transmit an expression of the selected service to object 120. Accordingly, as depicted in FIG. 3C, when end device 130 approaches reader 320 while tilting to the, e.g., right (relative to the used), service provider 110 may transmit, to object 120, the service expression describing a price of the movie that is advertised on object 120, and then the expression, i.e., price, is displayed on a display of object 120.

Thus, FIGS. 3A to 3C show yet other illustrative examples of a system in which one or more embodiments of motion based service provision may be implemented.

Figure 4A:
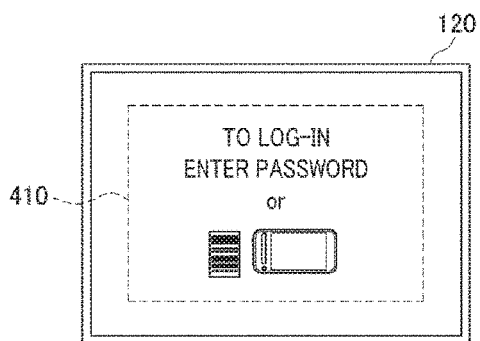
FIGS. 4A to 4C show yet further illustrative examples of a system in which one or more embodiments of motion based service provision may be implemented.
Figure 4B:
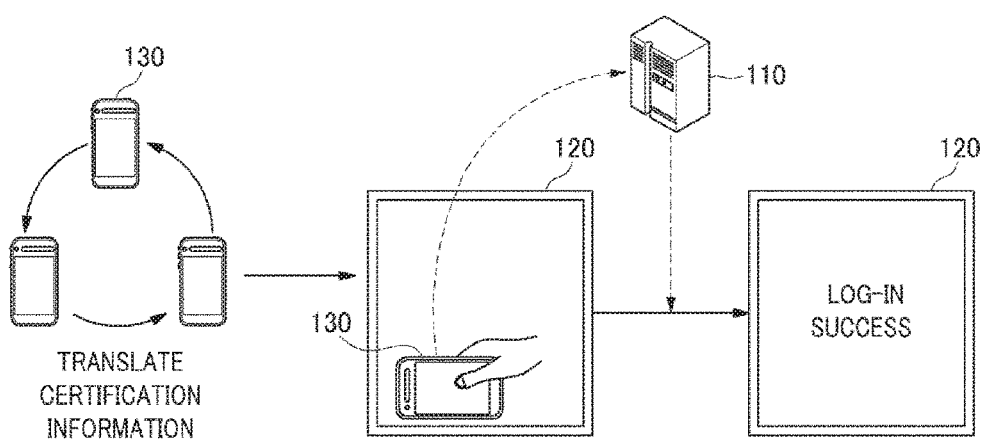
Figure 4C:
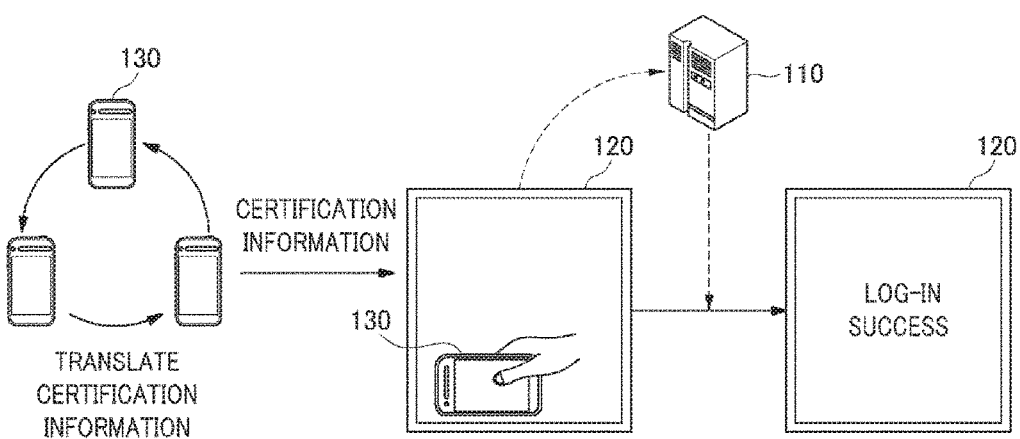

FIGS. 4A to 4C show yet further illustrative examples of a system in which one or more embodiments of motion based service provision may be implemented. In some embodiments, service provider 110 may transmit reference information 410 to object 120. Object 120 may receive the one or more embodiments of reference information 410 from service provider 110 and display reference information 410 for user's reference on a display of object 120. By way of example but not limitation, reference information 410 may depict that it is possible to log-in object 120 when end device 130 touches or approaches an electronic tag of object 120 or a reader of object 120 while tilting to, e.g., the left (relative to the user).

In some embodiments, certifying motion information may be stored in a memory of end device 130 in association with certification information of end device 130. A manufacturer of end device 130 or an owner or an entity that executes controls over end device 130 may pre-register and store the certification information of end device 130 in a local memory of end device 130. The certifying motion information may include a motion that is to be enacted by the user of end device 130 relative to, i.e., on or upon, end device 130 to identify/derive the certification information of end device 130. By way of example but not limitation, the certification information of end device 130 may include at least one of a cellular telephone number (CTN) assigned to end device 130, a unique identifier of the user of the end device 130, a password, a media access control (MAC) address of end device 130, etc.

By way of example, it may be assumed that the certifying motion information including a motion that is identical or analogous to a circular motion is stored in the memory of end device 130 in association with the certification information of end device 130. As depicted in FIG. 4B, when the user of end device 130 shakes end device 130 along a circular shape, end device 130 may obtain/derive the certification information of end device 130.

In some embodiments, end device 130 may translate parameters of the motion (e.g., circle motion) enacted on end device 130 into the certification information of end device 130. By way of example but not limitation, the parameters of the motion may include at least one of a direction of the motion, a velocity of the motion, or an acceleration of the motion. In some embodiments, end device 130 may calculate a motion similarity between the motion (e.g., circle motion) of end device 130 and the motion included in the certifying motion information by comparing the parameters of the motion and parameters of the motion included in the certificating motion information. Further end device 130 may determine whether a calculated quantified value of the motion similarity is at least a predetermined value in the memory of end device 130. If the calculated quantified value of motion similarity is at least the predetermined value, end device 130 may identify/derive the certification information of end device 130.

Further, in some embodiments, as depicted in FIG. 4B, end device 130 may touch or approach an electronic tag (not illustrated in FIG. 4B) of object 120 while tilting to the, e.g., left (relative to the user). Further, end device 130 may read the identification information of object 120 from the electronic tag by a reader such as a radio frequency identification reader, a near field communication reader, a barcode reader, a quick response code reader, etc.

Further, end device 130 may sense a motion (e.g., the tilting motion to the left) enacted thereon at the time of touching or approaching the electronic tag. Then, end device 130 may transmit the identified certification information of end device 130 in addition to a service request including the identification information of object 120 and motion information regarding the sensed motion (e.g., the tilting motion to the left) to service provider 110 via a wireless or a wired network.

Service provider 110 may receive the service request and the certification information of end device 130 from end device 130. Further, service provider 110 may select a service from among multiple services stored in a memory of service provider 110 based on the identification information of object 120, the motion information of end device 130 and the certification information of end device 130 and then, transmit a service expression of the selected service to object 120. By way of example, service provider 110 may be a certification server and certify end device 130 with regard to object 120 based on the received certification information of end device. In a memory of service provider 110, a certification service expression may be stored in association with the identification information of object 120, a motion that is identical or analogous to the, e.g., left (relative to the user) tilting motion and the certification information of end device 130. Accordingly, as depicted in FIG. 4B, when end device 130 approaches the electronic tag while tilting to the, e.g., left after shaking along a circular shape, service provider 110 may certify end device 130 with regard to object 120 and transmit the certification service expression, i.e., log-in success, to object 120. Then, the expression may be displayed on a display of object 120.

In some embodiments, as depicted in FIG. 4C, the certification information of end device 130 may be transmitted from end device 130 to object 120 via a wireless network of an electronic reader. By way of example, object 120 may read the certification information of end device 130 from an electronic tag (not illustrated in FIG. 4C) that is attached to a surface of end device 130 or inserted in end device 130 by a reader such as a radio frequency identification reader, a near field communication reader, a barcode reader, a quick response code reader, etc. Alternatively, object 120 may obtain the certification information of end device 130 via a wireless network between object 120 and end device 130. By way of example, but not limitation, the wireless network between object 120 and end device 130 may refer to at least one of a near field communication (NFC), Bluetooth, or peer to peer (P2P) communication protocol.

Further, in some embodiments, as depicted in FIG. 4C, end device 130 may touch or approach the reader (not illustrated in FIG. 4C) of object 120 while tilting to the, e.g., left (relative to the user). Further, end device 130 may sense a motion (e.g., the tilting motion to the left) enacted thereon at the time of touching or approaching the reader.

In some embodiments, object 120 may read motion information of the sensed motion (e.g., the left side tilting motion) enacted end device 130 by the reader. Then, object 120 may transmit the obtained certification information of end device 130 in addition to a service request including identification information of object 120 and the motion information regarding the sensed motion (e.g., the tilting motion to the left) to service provider 110 via a wireless or a wired network.

Service provider 110 may receive the service request and the certification information of end device 130 from object 120. Further, service provider 110 may select a service (e.g., a certification service) from among multiple services stored in a memory of service provider 110 based on the identification information of object 120, the motion information of end device 130 and the certification information of end device 130 and then, transmit a certification service expression, i.e., log-in success, to object 120.

Thus, FIGS. 4A to 4C show yet further illustrative examples of a system in one or more embodiments of motion based service provision may be implemented.

Figure 5:
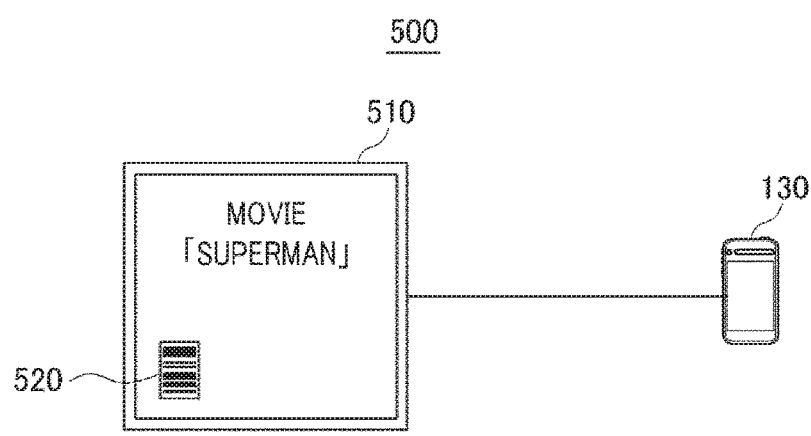
FIG. 5 shows still another example system configuration in which one or more embodiments of motion based service provision may be implemented.

FIG. 5 shows still another example system configuration in which one or more embodiments of motion based service provision may be implemented. As depicted in FIG. 5, system configuration 500 includes, at least, an object 510 and end device 130. In some embodiments, object 510 may pre-register and store service information regarding multiple services and reference motion information regarding at least one reference motion in association with the multiple services. Further, non-limiting examples of expressions of at least one service in response to the received request may include information regarding the subject matter that is displayed or advertised on object 510. Such a motion may be referred to as a reference motion, which may be a motion that is enacted by a user of end device 130 relative to, i.e., on or upon, end device 130 with the intention to receive an expression of a service from object 510.

Optionally, object 510 may pre-register and store additional information in association with the service information and the reference motion information. By way of example, but not limitation, the additional information may include at least one of time ranges in which a service is provided to object 510, weather information in the vicinity of object 510 when object 510 read motion information regarding a motion enacted on end device 130, noise information in the vicinity of object 510 when object 510 read motion information regarding a motion enacted on end device 130, or user information regarding a user of end device 130. By way of example, but not limitation, the user information regarding the user of end device 130 may include at least one of an age of the user, a gender of the user, etc.

Object 510 may be configured to read motion information regarding a motion enacted on end device 130. In some embodiments, object 510 may read the motion information of end device 130 by using a reader 520 from an electronic tag that may be attached to a surface of end device 130 or inserted in end device 130. By way of example, but not limitation, the electronic tag may include at least one of a radio frequency identification (RFD) tag, a near field communication (NFC) tag, a barcode, a quick response code, etc. End device 130 may sense the motion of end device 130 at the time of touching or approaching reader 520 of object 510 and store the motion information regarding the sensed motion in the electronic tag. Then, reader 520 of object 510 may read the motion information of end device 130 from the electronic tag.

In some embodiments, object 510 may read the motion information regarding the motion of end device 130 via a wireless network between object 510 and end device 130. By way of example, but not limitation, the wireless network between object 510 and end device 130 may refer to at least one of a near field communication (NFC), Bluetooth, or peer to peer (P2P) communication protocol.

Further, object 510 may compare the motion information regarding the motion enacted on end device 130 and the reference motion information stored in the memory of object 510. Upon comparing, object 510 may select a service from among the multiple services stored in the memory of object 510 based on the compared result. Iu somo embodiments, object 510 may calculate a motion similarity between the motion information regarding the motion enacted on end device 130 and the reference motion information stored in the memory of object 510. Further, object 510 may determine whether a calculated quantified value of the motion similarity is at least a predetermined value stored in the memory of object 510. If the calculated quantified value of motion similarity is at least the predetermined value, object 510 may select the service associated with reference motion information that is identical or analogous to the motion information of end device 130. Then, object 510 may display an expression of the selected service on object 120.

Optionally, object 510 may select a service from among the multiple services stored in the memory of object 510 based on the additional information as well as the calculated motion similarity. By way of example, but not limitation, object 510 may obtain a time at which object 510 read the motion information of end device 130. Further, object 510 may compare the time and the time ranges stored in the memory of object 510 to select the service. Then, object 510 may display an expression of the selected service on object 510.

Thus, FIG. 5 shows still another example system configuration in which one or more embodiments of motion based service provision may be implemented.

Figure 6:
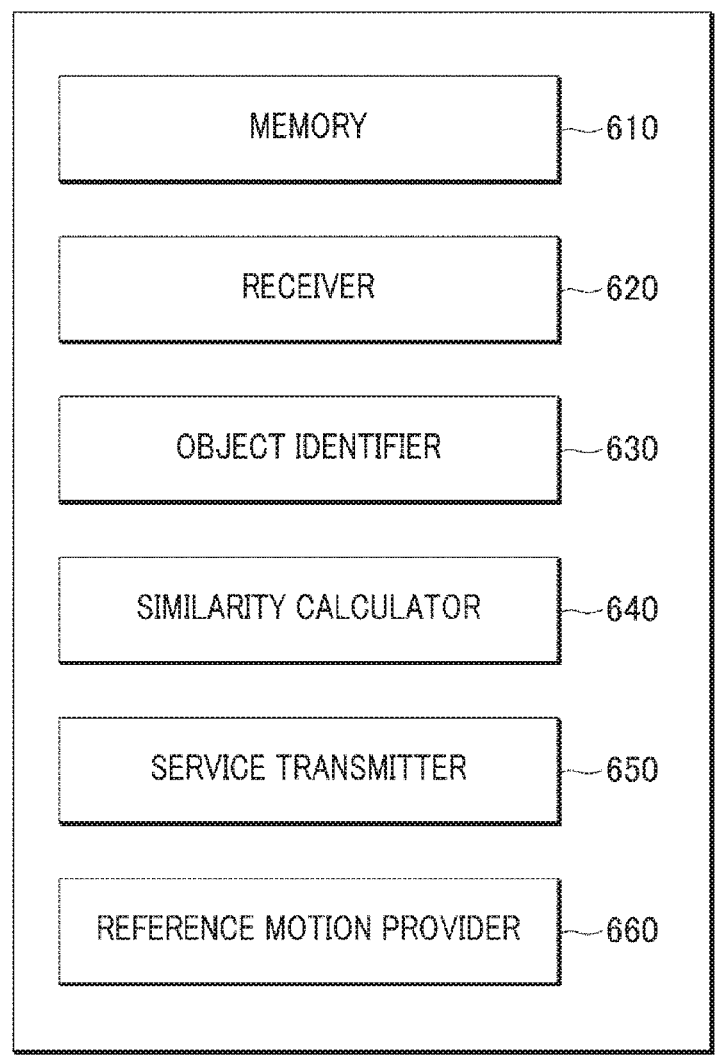
FIG. 6 shows an example configuration of a service provider by which at least portions of motion based service provision may be implemented.

FIG. 6 shows an example configuration of service provider 110 by which at least portions of motion based service provision may be implemented. As depicted in FIG. 6, service provider 110 may include a memory 610, a receiver 620, an object identifier 630, a similarity calculator 640, a service transmitter 650 and a reference motion provider 660. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of memory 610, receiver 620, object identifier 630, similarity calculator 640, service transmitter 650 and reference motion provider 660 may be included in an instance of an application hosted on service provider 110.

Memory 610 may be configured to store identification information of at least one object 120 and reference motion information regarding at least one reference motion in association with service information for at least one service to be provided to object 120. Optionally, memory 610 may be configured to store additional information including at least one of time ranges in which a service is provided to object 120, weather conditions, noise levels, age groups of users, genders of users, etc., in association with the service information. Further, memory 610 may be configured to store certification information of at least one end device 130 in association with the service information. By way of example, an owner or entity that executes controls over service provider 110 may pre-register at least one of the identification information of the at least one object 120, the reference motion information, the additional information, or the certification information in memory 610.

In some embodiments, receiver 620 may be configured to receive a service request from an end device 130, via a wireless or wired network. The service request may include identification information of an object and motion information regarding a motion that was enacted by a user of the end device relative to end device 130. Further, receiver 620 may be configured to receive additional information from end device 130 in addition to the service request. By way of example, but not limitation, the additional information received from end device 130 may include at least one of a time at which end device 130 sensed the motion enacted on end device 130, weather information in the vicinity of end device 130 when end device 130 sensed the motion, noise information in the vicinity of end device 130 when end device 130 sensed the motion, or user information regarding the user of end device 130. Further, receiver 620 may be configured to receive certification information of end device 130 from end device 130 in addition to the service request, via a wireless or wire network. By way of example, but not limitation, the certification information includes at least one of a cellular telephone number (CTN) assigned to end device 130, a unique identifier of the user of end device 130, a password, a media access control (MAC) address of end device 130.

In some embodiments, receiver 620 may be configured to receive the service request that includes motion information of end device 130 and identification information of object 120 from object 120, via a wireless or wired network. Further, receiver 620 may be configured to receive additional information from object 120 in addition to the service request. By way of example but not limitation, the additional information received from object 120 may include at least one of a time at which object 120 read the motion information of end device 130 from end device 130, weather information in the vicinity of object 120 when object 120 read the motion information of end device 130, noise information in the vicinity of object 120 when object 120 read the motion information of end device 130, or user information regarding the user of end device 130. Further, receiver 620 may be configured to receive the certification information of end device 130 from object 120 in addition to the service request.

Object identifier 630 may be configured to identify object 120 based on the identification information of object 120, which is included in the received service request.

Similarity calculator 640 may be configured to calculate a quantified value of a motion similarity between the reference motion information stored in memory 610 and the motion information of end device 130. By way of example, but not limitation, each of the motion information of end device 130 and the reference motion information may include parameters such as at least one of a direction, a velocity, an acceleration, etc. In some embodiments, similarity calculator 640 may calculate the quantified value of the motion similarity between the motion enacted on end device 130 and a reference motion defined by the reference motion information by comparing the parameters of the motion enacted on end device 130 and the parameters of the reference motion. Further, similarity calculator 640 may be configured to determine whether the calculated quantified value of the motion similarity is at least a predetermined value stored in memory 610. If the calculated quantified value of the motion similarity is at least the predetermined value, service provider 110 may determine that a user of end device 130 enacted a motion that corresponds to the reference motion defined by the reference motion information.

Service transmitter 650 may be configured to select a service from at least one service stored in association with the identification information of object 120 in memory 640, if the calculated quantified value of the motion similarity is at least the predetermined value. Optionally, service transmitter 650 may be configured to select a service further based on the additional information received from end device 130 or object 120. Further, service transmitter 650 may be configured to select a service further based on the certification information of end device 130. Further, service transmitter 650 may be configured to transmit an expression of the selected service to object 120.

In some embodiments, reference motion provider 660 may be configured to transmit the reference motion information regarding the at least one reference motion to end device 130, via a wireless or wired network. In some embodiments, reference motion provider 660 may be configured to transmit the reference motion information regarding the at least one reference motion to object 120, via a wireless or wired network.

Thus, FIG. 6 shows an example configuration of service provider 110 by which at least portions of motion based service provision may be implemented.

Figure 7:
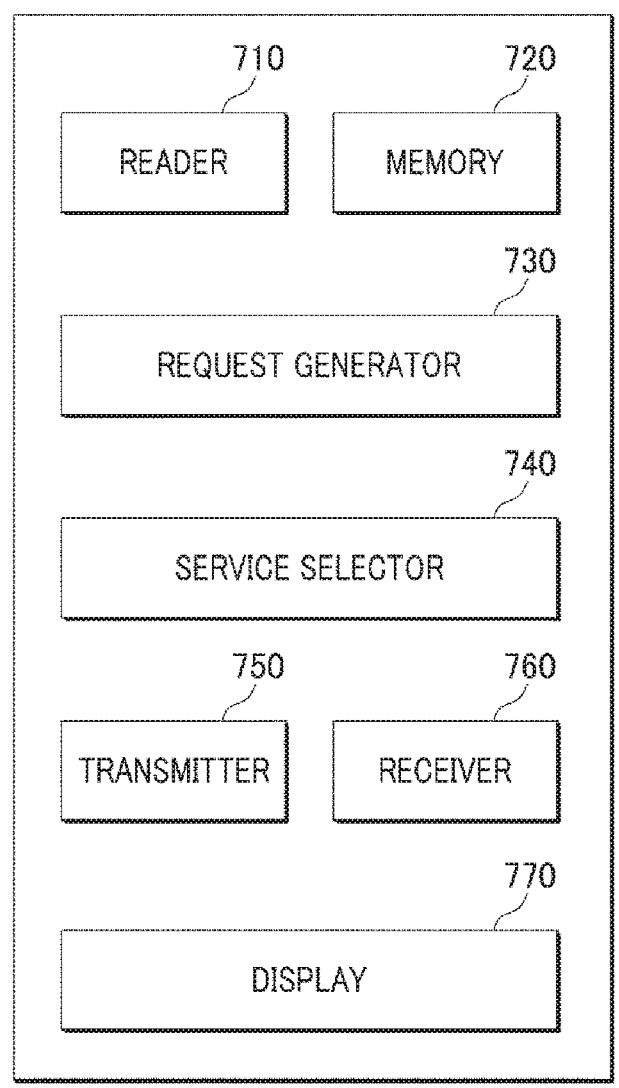
FIG. 7 shows an example configuration of an object by which at least portions of motion based service provision may be implemented.

FIG. 7 shows an example configuration of object 120 and/or 510 by which at least portions of motion based service provision may be implemented. As depicted in FIG. 7, object 120 and/or 510 may include one or more of a reader 710, a memory 720, a request generator 730, a service selector 740, a transmitter 750, a receiver 760 and a display 770. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of reader 710, memory 720, request generator 730, service selector 740, transmitter 750, receiver 760 and display 770 may be included in an instance of an application hosted on object 120 and/or 510.

In some embodiments, reader 710 may be configured to read motion information of end device 130 from an electronic tag that is attached or otherwise connected to a surface of end device 130 or inserted in end device 130. By way of example but not limitation, reader 710 may include a radio frequency identification reader, a near field communication reader, a barcode reader, a quick response code reader, etc.

In some embodiments, reader 710 may be configured to read the motion information of end device 130 via a wireless network between object 120 and/or 510 and end device 130. By way of example but not limitation, the wireless protocol between object 120 and/or 510 and end device 130 may refer to at least one of a near field communication (NFC), Bluetooth, or peer to peer (P2P) communication protocol.

In some embodiments, reader 710 may be configured to read certification information of end device 130 from end device 130. By way of example, but not limitation, the certification information of end device 130 may include at least one of a cellular telephone number (CTN) assigned to end device 130, a unique identifier of a user of end device 130, a password, a media access control (MAC) address of end device 130.

In some embodiments, memory 720 may be configured to store service information regarding multiple services and reference motion information in association with the multiple services. Optionally, memory 720 may be configured to store additional information in association with the service information and the reference motion information. By way of example hut not limitation, the additional information may include at least one of time ranges at which object 510 provides a service to end device 130, weather information in the vicinity of object 510 when object 510 read motion information of end device 130, noise information in the vicinity of object 510 when object 510 read motion information of end device 130, or user information regarding the user of end device 130. By way of example, an owner or entity that executes controls over object 510 may pre-register at least one of the service information, the reference motion information, or the additional information, in memory 720.

In some embodiments, memory 720 may be configured to store at least one service request in association with the reference motion information. By way of example, an owner or entity that executes controls over object 510 may pre-register the at least one service request in memory 720.

In some embodiments, request generator 730 may be configured to select a service request from the least one service request stored in memory 720. Alternatively, request generator 730 may generate a service request when reader 710 obtains the motion information of end device 130.

In some embodiments, service selector 740 may be configured to compare the motion information of end device 130 and the reference motion information. Upon comparing, service selector 740 may select a service from among the multiple services stored in memory 720 based on the compared result. In some embodiments, service selector 740 may calculate a quantified value of a motion similarity between the motion information of end device 130 and the reference motion information. By way of example but not limitation, each of the motion information of end device 130 and the reference motion information may include parameters such as at least one of a direction, a velocity, an acceleration, etc. In some embodiments, service selector 740 may calculate the quantified value of the motion similarity between the otion enacted on end device 130 and a reference motion defined by the reference motion information by comparing the parameters of the motion enacted on end device 130 and the parameters of the reference motion. Further, service selector 740 may determine whether the calculated quantified value of the motion similarity is at least a predetermined value stored in memory 720. If the calculated quantified value of the motion similarity is at least the predetermined value, service selector 740 may select the service associated with the reference motion information that is identical or analogous to the motion information of end device 130.

In some embodiments, service selector 740 may be configured to select a service from among the multiple services stored in memory 720 based on the additional information as well as the calculated motion similarity.

In some embodiments, transmitter 750 may be configured to transmit the service request to service provider 110 via a wireless or wired network. The service request may include identification information of object 120 and the read motion information of end device 130. Optionally, transmitter 750 may be configured to transmit, to service provider 110, additional information in addition to the service request. By way of example, but not limitation, the additional information may include at least one of a time at which transmitter 750 transmits the service request to service provider 110, a location of object 120 when object 120 read motion information of end device 130, weather information in the vicinity of object 120 when object 120 read motion information of end device 130, noise information in the vicinity of object 120 when object 120 read motion information of end device 130, or user information regarding the user of end device 130.

In some embodiments, transmitter 750 may be configured to transmit, to service provider 110, the certification information of end device 130, which is read by reader 710 from end device 130 in addition to the service request.

In some embodiments, receiver 760 may be configured to receive, from service provider 110, an expression of a service that is associated with the identification information of object 120 and the motion information of end device 130. As set forth above, non-limiting examples of expressions of a service provided from service provider 110 may include information regarding the subject matter that is displayed or advertised on object 120. In some embodiments, receiver 760 may be configured to receive, from service provider 110, an expression of a service that is associated with the certification information of end device 130 as well as the identification information of object 120 and the motion information of end device 130.

In some embodiments, receiver 760 may be configured to receive, from service provider 110, the reference motion information association with the multiple services.

Display 770 may be configured to display the expression of the service, which is received from service provider 110 or which is stored in memory 720. Further, display 770 may be configured to display at least a portion of the reference motion information.

Thus, FIG. 7 shows an example configuration of object 120 and/or 510 by which at least portions of motion based service provision may be implemented.

Figure 8:
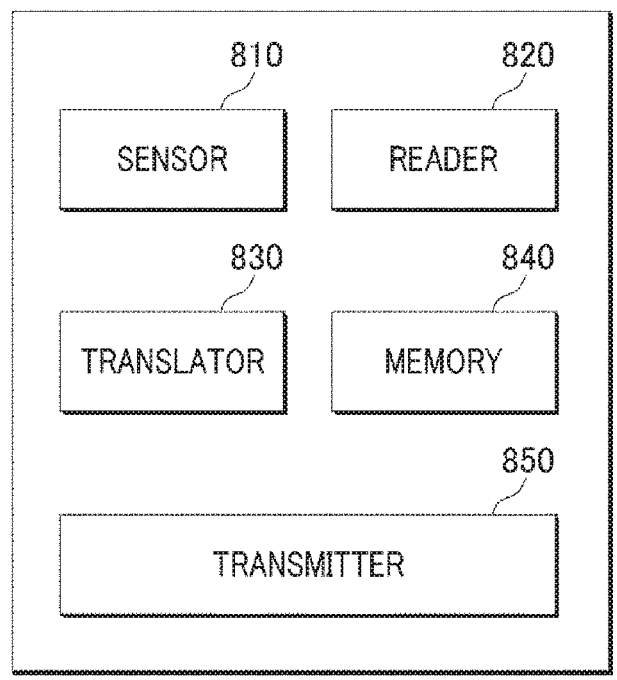
FIG. 8 shows an example configuration of an end device by which at least portions of motion based service provision may be implemented.

FIG. 8 shows an example configuration of end device 130 by which at least portions of motion based service provision may be implemented. As depicted in FIG. 8, end device 130 may include one or more of a sensor 810, a reader 820, a translator 830, a memory 840 and a transmitter 850. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of sensor 810, reader 820, translator 830, memory 840 and transmitter 850 may be included in an instance of an application hosted on end device 130.

Sensor 810 may be configured to may be configured to sense a motion of end device 130. Sensor 810 may sense the motion enacted on end device 130 by using one or more of well-known motion sensors such as a gyroscope, an accelerometer and a motion detecting camera.

In some embodiments, reader 820 may be configured to read identification information of an object 120 from an electronic tag that is attached to a surface of object 120 or inserted in object 120. By way of example but not limitation, reader 820 may include a radio frequency identification reader, a near field communication reader, a barcode reader, a quick response code reader, etc. Further, the identification information of object 120 may include at least one of a unique identifier of object 120, a media access control (MAC) address of object 120, an internet protocol (IP) address of object 120, a uniform resource identifier (URI) stored in object 120 or a location of object 120.

In some embodiments, reader 820 may be configured to read the identification information of object 120 via a wireless network between object 120 and end device 130. By way of example but not limitation, the wireless network between object 120 and end device 130 may refer to at least one of a near field communication (NFC), Bluetooth, or peer to peer (P2P) communication protocol.

In some embodiments, translator 830 may be configured to translate parameters of the sensed motion enacted on end device 130 into certification information of end device 130. In some embodiments, end device 130 may calculate a quantified value of motion similarity between the sensed motion of end device 130 and a certificating motion stored in memory 840. The certification motion, which may refer to be a motion that is to be enacted by the user of end device 130 relative to, i.e., on or upon, end device 130 with the intention to identify/derive the certification information from memory 840. By way of example, but not limitation, each of the sensed motion enacted on end device 130 and the certificating motion may include parameters such as at least one of a direction, a velocity, an acceleration, etc. In some embodiments, translator 830 may calculate the quantified value of motion similarity between the sensed motion of end device 120 and the certificating motion by comparing the parameters of the sensed motion and the parameters of the certificating motion. Further translator 830 may determine whether the calculated quantified value of the motion similarity is at least a predetermined value stored in memory 840 of end device 130. If the calculated quantified value of the motion similarity is at least the predetermined value, translator 830 may identify/derive the certification information of end device 130.

In some embodiments, memory 840 may be configured to store the certification information of end device 130. Further, memory 840 may be configured to store certificating motion information regarding the certificating motion. Further, memory 840 may be configured to store at least one service request. By way of example, the user of end device 130 may pre-register at least one of the certification information, certificating motion information, or the at least one service request in memory 840

In some embodiments, transmitter 850 may be configured to transmit a service request to service provider 110, via a wireless or wired network. The service request may include the identification information of object 120 and motion information regarding the sensed motion enacted on end device 130.

In some embodiments, transmitter 850 may be configured to transmit additional information to at least one of service provider 110 or object 120/510, via a wireless or wired network. By way of example but not limitation, the additional information may include at least one of a time at which sensor 810 sensed the motion enacted on end device 130, weather information in the vicinity of end device 130 when sensor 810 sensed the motion enacted on end device 130, noise information in the vicinity of end device 130 when sensor 810 sensed the motion enacted on end device 130, or user information regarding the user of end device 130.

In some embodiments, transmitter 850 may be configured to transmit the certification information of end device 130 to at least one of service provider 110 or object 120/510.

Thus, FIG. 8 shows an example configuration of end device 130 by which at least portions of motion based service provision may be implemented.

Figure 9:
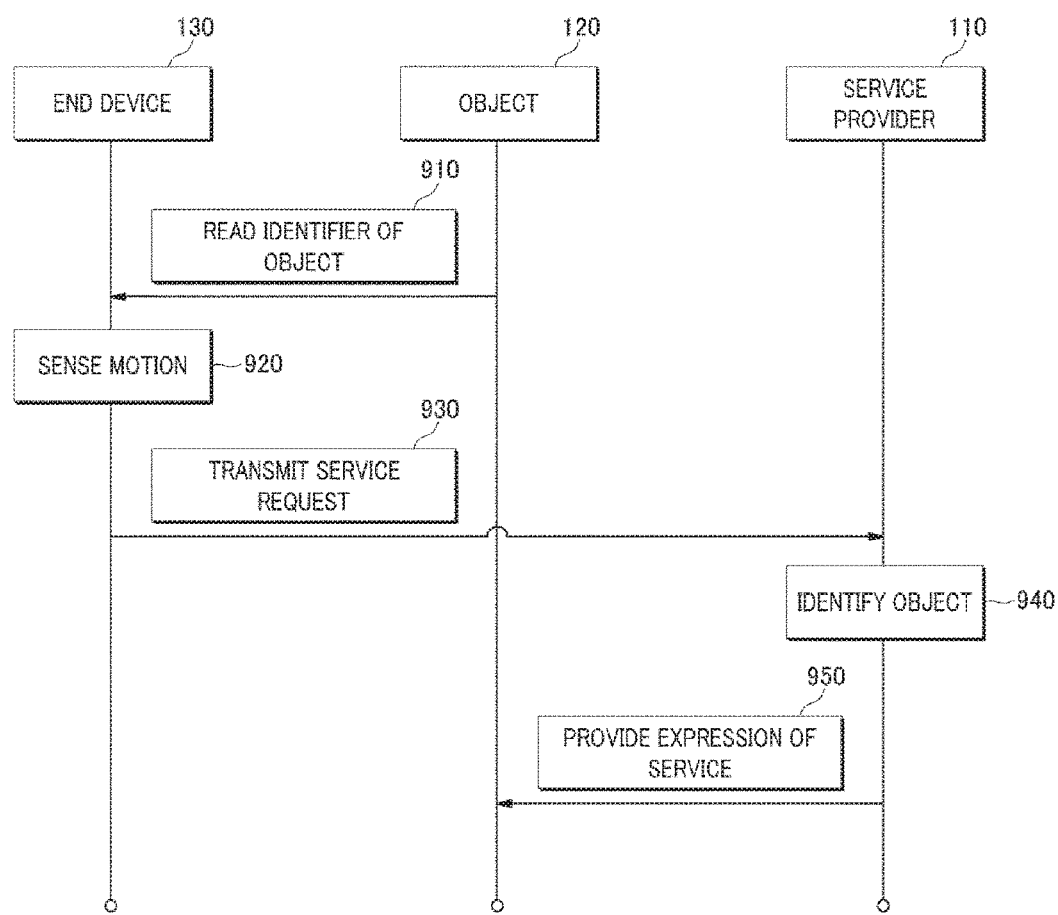
FIG. 9 shows an example processing flow of operations for implementing at least portions of motion based service provision.

FIG. 9 shows an example processing flow of operations for implementing at least portions of motion based service provision. The operations in FIG. 9 may be implemented in system configuration 100 including service provider 110, object 120 and end device 130, as illustrated in FIG. 1. An example process may include one or more operations, actions, or functions as illustrated by one or more blocks 910, 920, 930, 940 and/or 950. Although illustrated as discrete blocks, various blocks may be divided into additional blocks, combined into fewer blocks, or eliminated, depending on the desired implementation. Processing may begin at block 910.

At block 910 (Read Identifier of Object), end device 130 may read identification information of object 120 by using a reader such as a radio frequency identification reader, a near field communication reader, a barcode reader, a quick response code reader, etc. In some embodiments, at block 910, end device 130 may read the identification information of object 120 via a wireless network or protocol between object 120 and end device 130. Processing may proceed from block 910 to block 920.

At block 920 (Sense Motion), end device 130 may sense a motion that was enacted by a user of end device 130 when end device 130 read the identification information of object 120. The motion may be sensed by using one or more of well-known motion sensors such as a gyroscope, an accelerometer and a motion detecting camera that are built-in, connected, or otherwise associated with end device 130. Processing may proceed from block 920 to block 930.

At block 930 (Transmit Service Request), end device 130 may transmit, to service provider 110 via a wireless or wired network, a service request that includes the identification information of object 120, which is read at block 910 and motion information regarding the motion sensed at block 920. Processing may proceed from block 930 to block 940.

At block 940 (Identify Object), service provider 110 may identify object 120 based on the received identification information of object 120. Processing may proceed from block 940 to block 950.

At block 950 (Provide Expression of Service), service provider 110 may select a service from multiple services stored in a memory of service provider 110 based on the motion information of end device 130. By way of example but not limitation, each of the motion information of end device 130 and reference motion information stored in the memory of service provider 110 may include parameters such as at least one of a direction, a velocity, an acceleration, etc. In some embodiments, service provider 110 may calculate a quantified value of a motion similarity between the motion enacted on end device 130 and a reference motion defined by the reference motion information by comparing the parameters of the motion enacted on end device 130 and the parameters of the reference motion. Further, service provider 110 may be configured to determine whether the calculated quantified value of the motion similarity is at least a predetermined value stored in the memory of service provider 110. If the calculated quantified value of the motion similarity is at least the predetermined value, service provider 110 may select a service associated with the reference motion information that is identical or analogous to the motion information of the end device 130. Then, service provider 110 may transmit an expression of the selected service to identified object 120, via a wireless or wired network. As set forth above, non-limiting examples of expressions of a service provided from service provider 110 may include information regarding the subject matter that is displayed or advertised on object 120. At block 950, object 120 may receive the expression of the service and display the received expression of the service on a display of object 120.

Thus, FIG. 9 shows an example processing flow of operations for implementing at least portions of motion based service provision.

Figure 10:
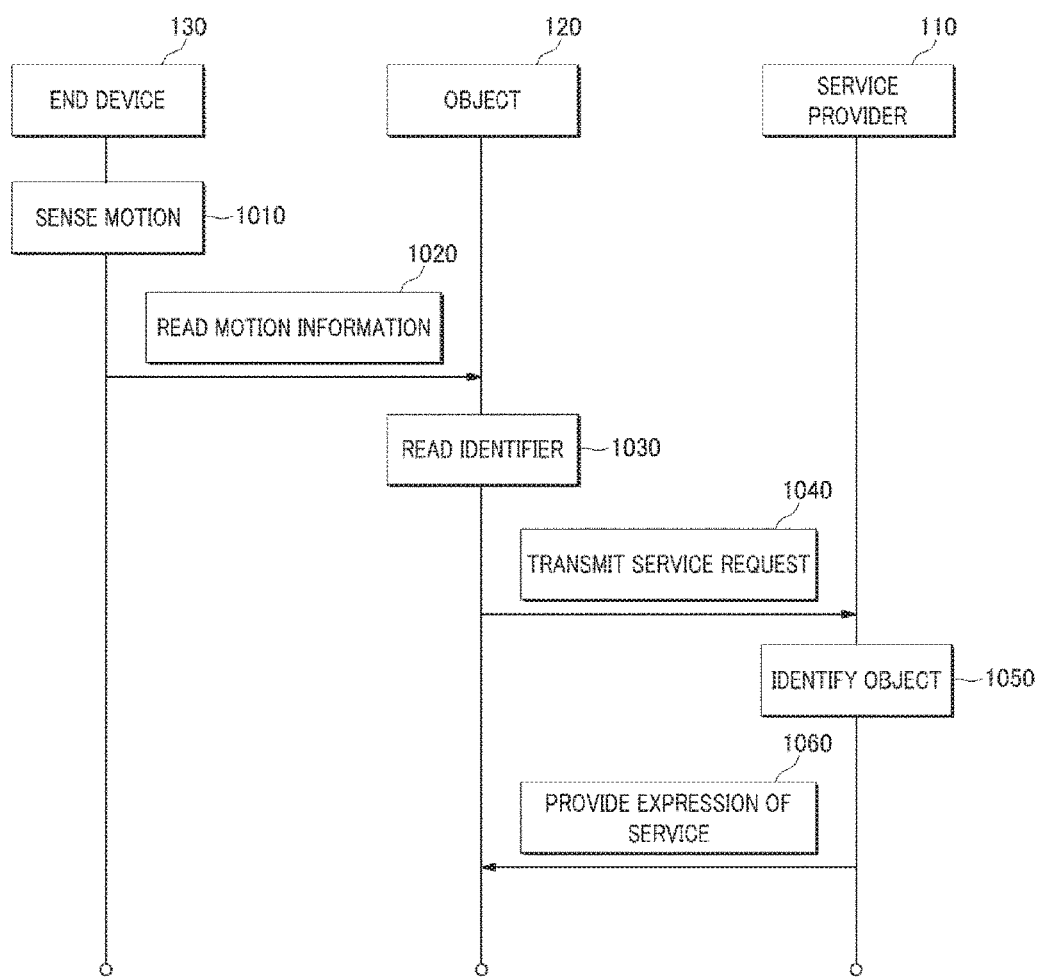
FIG. 10 shows yet other example processing flow of operations for implementing at least portions of motion based service provision.

FIG. 10 shows yet other example processing flow of operations for implementing at least portions of motion based service provision. The operations in FIG. 10 may be implemented in system configuration 100 including service provider 110, object 120 and end device 130, as illustrated in FIG. 1. An example process may include one or more operations, actions, or functions as illustrated by one or more blocks 1010, 1020, 1030, 1040, 1050 and/or 1060. Although illustrated as discrete blocks, various blocks may be divided into additional blocks, combined into fewer blocks, or eliminated, depending on the desired implementation. Processing may begin at block 1010.

At block 1010 (Sense Motion), end device 130 may sense a motion of end device 130 when object 120 read motion information of end device 130 at block 1020. The motion may be sensed by using one or more of well-known motion sensors such as a gyroscope, an accelerometer and a motion detecting camera that are built-in, connected, or otherwise associated with end device 130. Processing may proceed from block 1010 to block 1020.

At block 1020 (Read Motion Information), object 120 may read the motion information regarding the sensed motion enacted on end device 130 by using a reader such as a radio frequency identification reader, a near field communication reader, a barcode reader, a quick response code reader, etc. In some embodiments, at block 1020, object 120 may read the motion information of end device 130 via a wireless network between object 120 and end device 130. Processing may proceed from block 1020 to block 1030.

At block 1030 (Read Identifier), object 120 may read identification information of object 120 stored in a memory of object 120. Processing may proceed from block 1030 to block 1040.

At block 1040 (Transmit Service Request), object 120 may transmit, to service provider 110 via a wireless or wired network, a service request that includes the identification information of object 120, which is read at block 1030 and the motion information regarding the sensed motion enacted on end device 130, which is read at block 1020. Processing may proceed from block 1040 to block 1050.

At block 1050 (Identify Object), service provider 110 may identify object 120 based on the received identification information of object 120. Processing may proceed from block 1050 to block 1060.

At block 1060 (Provide Expression of Service), service provider 110 may select a service from multiple services stored in a memory of service provider 110 based on the motion information of end device 130. By way of example but not limitation, each of the motion information of end device 130 and reference motion information stored in the memory of service provider 110 may include parameters such as at least one of a direction, a velocity, an acceleration, etc. In some embodiments, service provider 110 may calculate a quantified value of a motion similarity between the motion enacted on end device 130 and a reference motion defined by the reference motion information by comparing the parameters of the motion enacted on end device 130 and the parameters of the reference motion. Further, service provider 110 may be configured to determine whether the calculated quantified value of the motion similarity is at least a predetermined value stored in the memory of service provider 110. If the calculated quantified value of the motion similarity is at least the predetermined value, service provider 110 may select a service associated with the reference motion information that is identical or analogous to the motion information of the end device 130. Then, service provider 110 may transmit an expression of the selected service to identified object 120, via a wireless or wired network. As set forth above, non-limiting examples of expressions of a service provided from service provider 110 may include information regarding the subject matter that is displayed or advertised on object 120. At block 1060, object 120 may receive the expression of the service and display the received expression of the service on a display of object 120.

Thus, FIG. 10 shows yet another example processing flow of operations for implementing at least portions of motion based service provision.

Figure 11:
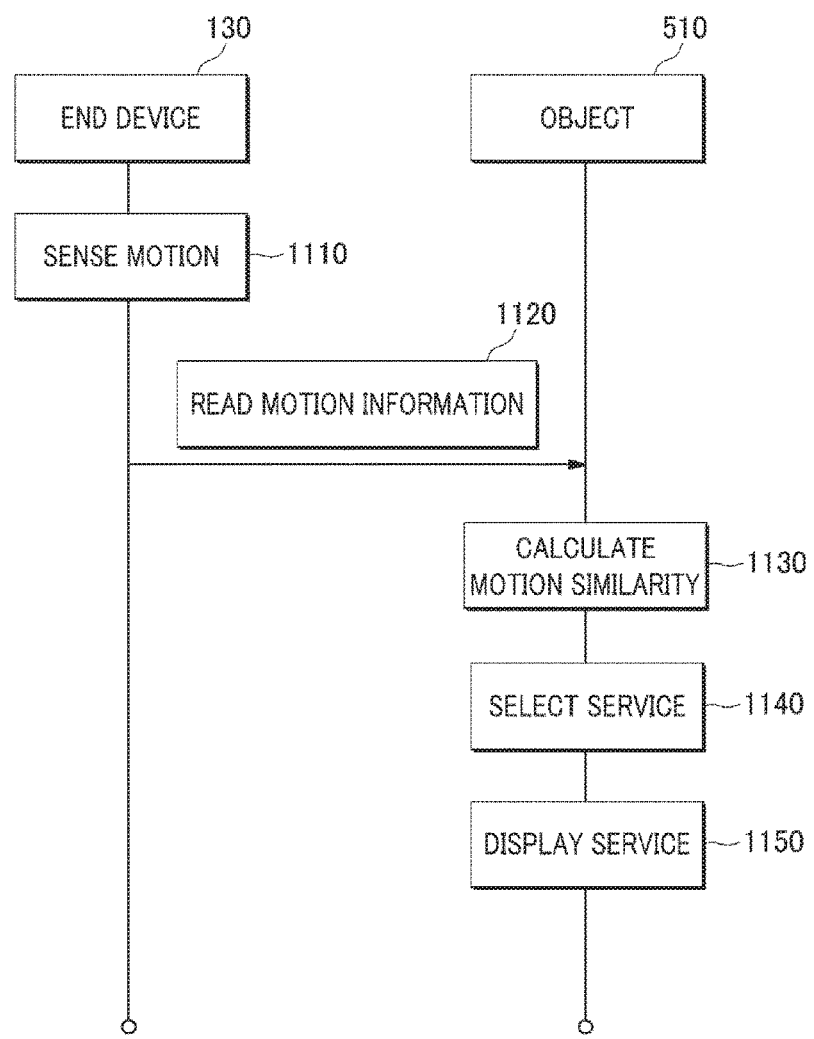
FIG. 11 shows yet a further example processing flow of operations for implementing at least portions of motion based service provision.

FIG. 11 shows yet a further example processing flow of operations for implementing at least portions of motion based service provision. The operations in FIG. 11 may be implemented in system configuration 500 including object 510 and end device 130, as illustrated in FIG. 5. An example process may include one or more operations, actions, or functions as illustrated by one or more blocks 1110, 1120, 1130, 1140 and/or 1150. Although illustrated as discrete blocks, various blocks may be divided into additional blocks, combined into fewer blocks, or eliminated, depending on the desired implementation. Processing may begin at block 1110.

At block 1110 (Sense Motion), end device 130 may sense a motion of end device 130 when object 510 read motion information of end device 130 at block 1120. The motion may be sensed by using one or more of well-known motion sensors such as a gyroscope, an accelerometer and a motion detecting camera that are built-in, connected, or otherwise associated with end device 130. Processing may proceed from block 1110 to block 1120.

At block 1120 (Read Motion Information), object 510 may read the motion information regarding the sensed motion enacted on end device 130 by using a reader such as a radio frequency identification reader, a near field communication reader, a barcode reader, a quick response code reader, etc. In some embodiments, at block 1120, object 510 may read the motion information of end device 130 via a wireless network between object 510 and end device 130. Processing may proceed from block 1120 to block 1130.

At block 1130 (Calculate Motion Similarity), object 510 may calculate a quantified value of motion similarity between the motion information regarding the sensed motion enacted on end device 130 and reference motion information stored in a memory of object 510. By way of example, but not limitation, each of the motion information of end device 130 and the reference motion information may include parameters such as at least one of a direction, a velocity, an acceleration, etc. In some embodiments, object 510 may calculate the quantified value of the motion similarity between the motion enacted on end device 130 and a reference motion defined by the reference motion information by comparing the parameters of the motion enacted on end device 130 and the parameters of the reference motion. Further, object 510 may determine whether the calculated quantified value of the motion similarity is at least a predetermined value stored in the memory of object 510. If the calculated quantified value of the motion similarity is at least the predetermined value, object 510 may determine that a user of end device 130 enacted a motion that corresponds to the reference motion defined by the reference motion information. Processing may proceed from block 1130 to block 1140.

At block 1140 (Select Service), object 510 may select a service associated with the reference motion information that is identical or analogous to the motion information of end device 130 when the calculated quantified value of the motion similarity is at least the predetermined value. Processing may proceed from block 1140 to block 1150.

At block 1150 (Display Service), object 510 may display an expression of the service selected at block 1140 on a display of object 510. As set forth above, non-limiting examples of expressions of a service displayed on a display of object 510 may include information regarding the subject matter that is displayed or advertised on object 510

Thus, FIG. 11 shows yet another example processing flow of operations for implementing at least portions of motion based service provision.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 12:
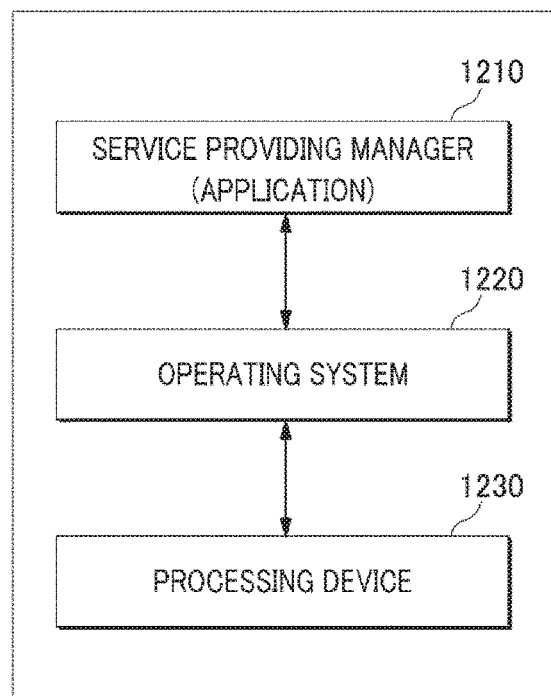
FIG. 12 shows still another example configuration of a service provider by which at least portions of motion based service provision may be implemented.

FIG. 12 shows still another example configuration of service provider 110 by which at least portions of motion based service provision may be implemented. As depicted, service provider 110 may include service providing manager 1210, an operating system 1220 and a processor 1230. Service providing manager 1210 may be an application adapted to operate on operating system 1220 such that the motion based service providing schemes as described herein may be provided. Operating system 1220 may allow service providing manager 1210 to manipulate processor 1230 to implement the motion based service providing schemes as described herein.

Figure 13:
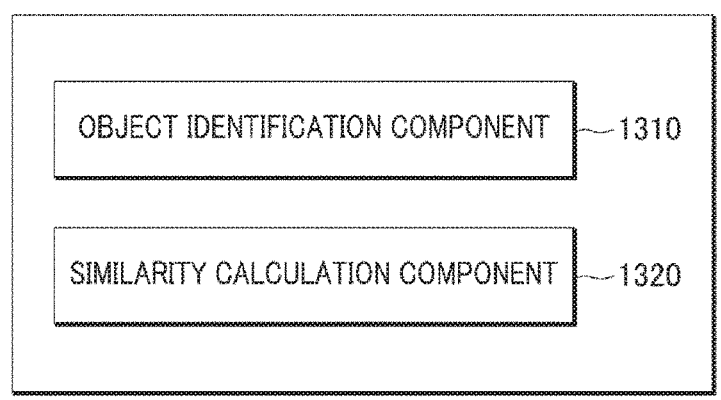
FIG. 13 shows an example configuration of a service providing manager by which at least portions of motion based service provision may be implemented.

FIG. 13 shows an example configuration of service providing manager 1210 by which at least portions of motion based service provision may be implemented. As depicted, service providing manager 1210 may include an object identification component 1310, and a similarity calculation component 1320.

Object identification component 1310 may be adapted to identify object 120 based on identification information of object 120. The identification information of object 120 may be transmitted from at least one of object 120 or end device 130 via a wireless or wired network.

Similarity calculation component 1320 may be adapted to calculate a quantified value of motion similarity between motion information of end device 130 and reference motion information stored in a memory of service provider 110. By way of example, but not limitation, each of the motion information of end device 130 and the reference motion information stored in the memory of service provider 110 may include parameters such as at least one of a direction, a velocity, an acceleration, etc. In some embodiments, similarity calculation component 1320 may calculate the quantified value of the motion similarity between the motion enacted on end device 130 and a reference motion defined by the reference motion information by comparing the parameters of the motion enacted on end device 130 and the parameters of the reference motion. Further, similarity calculation component 1320 may be configured to determine whether the calculated quantified value of the motion similarity is at least a predetermined value stored in the memory of service provider 110. If the calculated quantified value of the motion similarity is at least the predetermined value, similarity calculation component 1320 may select a service associated with the reference motion information that is identical or analogous to the motion information of the end device 130.

Thus, FIG. 12 shows yet another example configuration of service provider 110 by which at least portions of motion based service provision may be implemented, and FIG. 13 shows an example configuration of service providing manager 1210 by which at least portions of motion based service provision may be implemented.

Figure 14:
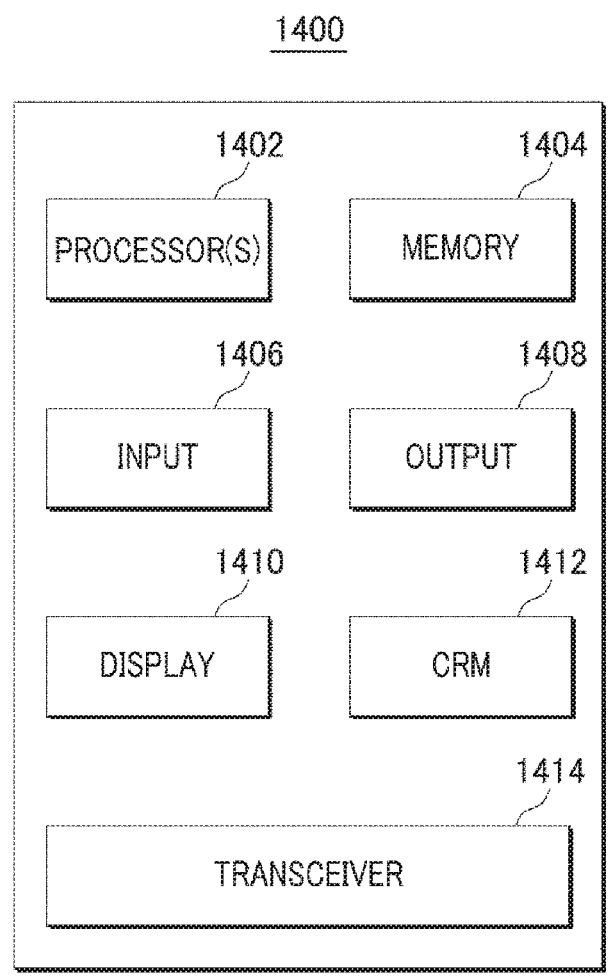
FIG. 14 shows an illustrative computing embodiment, in which any of the processes and sub-processes of motion based service provision may be implemented as computer-readable instructions stored on a computer-readable medium.

FIG. 14 shows an illustrative computing embodiment, in which any of the processes and sub-processes of motion based service provision may be implemented as computer-readable instructions stored on a computer-readable medium. The computer-readable instructions may, for example, be executed by a processor of a device, as referenced herein, having a network element and/or any other device corresponding thereto, particularly as applicable to the applications and/or programs described above corresponding to the configuration 100 for transactional permissions.

In a very basic configuration, a computing device 1400 may typically include, at least, one or more processors 1402, a system memory 1404, one or more input components 1406, one or more output components 1408, a display component 1410, a computer-readable medium 1412, and a transceiver 1414.

Processor 1402 may refer to, e.g., a microprocessor, a microcontroller, a digital signal processor, or any combination thereof.

Memory 1404 may refer to, e.g., a volatile memory, non-volatile memory, or any combination thereof. Memory 1404 may store, therein, an operating system, an application, and/or program data. That is, memory 1404 may store executable instructions to implement any of the functions or operations described above and, therefore, memory 1404 may be regarded as a computer-readable medium.

Input component 1406 may refer to a built-in or communicatively coupled keyboard, touch screen, or telecommunication device. Alternatively, input component 1406 may include a microphone that is configured, in cooperation with a voice-recognition program that may be stored in memory 1404, to receive voice commands from a user of computing device 1400. Further, input component 1406, if not built-in to computing device 1400, may be communicatively coupled thereto via short-range communication protocols including, but not limitation, radio frequency or Bluetooth.

Output component 1408 may refer to a component or module, built-in or removable from computing device 1400, that is configured to output commands and data to an external device.

Display component 1410 may refer to, e.g., a solid state display that may have touch input capabilities. That is, display component 1410 may include capabilities that may be shared with or replace those of input component 1406.

Computer-readable medium 1412 may refer to a separable machine readable medium that is configured to store one or more programs that embody any of the functions or operations described above. That is, computer-readable medium 1412, which may be received into or otherwise connected to a drive component of computing device 1400, may store executable instructions to implement any of the functions or operations described above. These instructions may be complimentary or otherwise independent of those stored by memory 1404.

Transceiver 1414 may refer to a network communication link for computing device 1400, configured as a wired network or direct-wired connection. Alternatively, transceiver 1414 may be configured as a wireless connection, e.g., radio frequency (RF), infrared, Bluetooth, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A display apparatus, comprising:
    a reader, implemented as part of the display apparatus and configured to read real-time motion information, received from a mobile end device, regarding a real-time motion that was enacted upon the mobile end device with respect to the reader of the display apparatus at the time when the mobile end device is touching or approaching the reader of the display apparatus;
    a memory, implemented as part of the display apparatus and configured to store a plurality of reference motion information associated with a plurality of services and service information regarding the plurality of services, wherein each of the plurality of reference motion information is associated with a reference motion enacted upon the mobile end device with respect to the reader of the display apparatus at the time when the mobile end device is touching or approaching the reader of the display apparatus;
    a service selector, implemented as part of the display apparatus and configured to compare the read real-time motion information with the stored plurality of reference motion information to select a service from among the stored plurality of services; and
    a stationary display, implemented as part of the display apparatus and that is physically separated from the mobile end device, configured to display an expression of the selected service.

2. The display apparatus of claim 1, wherein the service selector is further configured to determine that a similarity between the read real-time motion information and one of the stored plurality of reference motion information is quantifiable to be at least a predetermined value, and
    wherein the service selector is configured to select the service based on the similarity.

3. The display apparatus of claim 1, wherein the reader is configured to read the real-time motion information that is received from the mobile end device via a wireless network between the display apparatus and the mobile end device, and
    wherein the wireless network enables at least one of a near field communication (NFC), Bluetooth, and peer to peer (P2P) communication protocol.

4. The display apparatus of claim 1, wherein the service selector is configured to select the service further based on a time at which the reader reads the real-time motion information from the mobile end device.

5. The display apparatus of claim 1, wherein the stationary display is further configured to display at least a portion of the reference motion information from among the plurality of reference motion information.

* * * * *